(12) United States Patent
Schwarm

(10) Patent No.: US 8,483,861 B2
(45) Date of Patent: Jul. 9, 2013

(54) SCHEDULING MODELING SYSTEM FOR ADAPTIVE, AUTOMATED DATA COLLECTION AND PERFORMANCE ANALYSIS OF MANUFACTURING SYSTEM FOR OPTIMAL SCHEDULING

(75) Inventor: Alexander T. Schwarm, Austin, TX (US)

(73) Assignee: Applied Materials, Inc., Santa Clara, CA (US)

( * ) Notice: Subject to any disclaimer, the term of this patent is extended or adjusted under 35 U.S.C. 154(b) by 303 days.

(21) Appl. No.: 12/873,229

(22) Filed: Aug. 31, 2010

(65) Prior Publication Data

US 2011/0060443 A1    Mar. 10, 2011

Related U.S. Application Data

(60) Provisional application No. 61/238,384, filed on Aug. 31, 2009.

(51) Int. Cl.
    *G06F 19/00*    (2011.01)
(52) U.S. Cl.
    USPC .............................. 700/104; 700/149; 700/121
(58) Field of Classification Search
    USPC ............................... 700/100, 104, 121; 703/2
    See application file for complete search history.

(56) References Cited

U.S. PATENT DOCUMENTS

| 6,201,999 | B1 * | 3/2001 | Jevtic ............................ 700/100 |
| 6,556,884 | B1 * | 4/2003 | Miller et al. ................... 700/121 |
| 6,556,959 | B1 * | 4/2003 | Miller et al. ...................... 703/2 |
| 6,785,586 | B1 * | 8/2004 | Toprac et al. ................. 700/110 |
| 6,876,894 | B1 * | 4/2005 | Chen et al. .................... 700/100 |
| 7,460,920 | B1 * | 12/2008 | Qu et al. ........................ 700/101 |
| 7,653,451 | B2 * | 1/2010 | Denton et al. ................... 700/99 |
| 7,908,127 | B2 * | 3/2011 | Weigang et al. .................. 703/6 |
| 8,000,946 | B2 * | 8/2011 | Haas et al. ......................... 703/6 |
| 2009/0037013 | A1 * | 2/2009 | Hendler et al. ............... 700/103 |
| 2009/0222123 | A1 * | 9/2009 | Nevills et al. ................. 700/104 |
| 2010/0057237 | A1 * | 3/2010 | Kettaneh et al. .............. 700/103 |

* cited by examiner

*Primary Examiner* — Mohammad Ali
*Assistant Examiner* — Sivalingam Sivanesan
(74) *Attorney, Agent, or Firm* — Blakely, Sokoloff, Taylor & Zafman LLP

(57) ABSTRACT

A scheduler system obtains a basic model of a manufacturing process for the production of one or more products. The basic model is based on a first set of data collected at a point in time from a plurality of tools used to manufacture the one or more products. The system incorporates a second set of data, which is collected from the plurality of tools after the first set of data, into the basic model to generate a comprehensive model of the manufacturing process. The second set of data reflects a current state of a factory. The system evaluates a plurality of scheduling policies using the comprehensive model and selects an optimal scheduling policy from the plurality of scheduling policies based on the comprehensive process model evaluation to achieve a manufacturing objective.

20 Claims, 5 Drawing Sheets

SCHEDULING MODELING SYSTEM FOR ADAPTIVE, AUTOMATED DATA COLLECTION AND PERFORMANCE ANALYSIS OF MANUFACTURING SYSTEM FOR OPTIMAL SCHEDULING

RELATED APPLICATION

The present application claims priority to U.S. Provisional Application Ser. No. 61/238,384, filed Aug. 31, 2009, which is incorporated herein in its entirety.

TECHNICAL FIELD

Embodiments of the present invention relate to scheduling generally, and more particularly, to determining an optimal scheduling policy using state data that reflects a current state of a factory.

BACKGROUND OF THE INVENTION

Scheduler systems typically utilize a model of a manufacturing process, such as a process to manufacture product A and product B, to calculate or determine an optimal manufacturing schedule. A user, such as an industrial engineer and a factory administrator, may perform an analysis of the process tool behavior before implementing a scheduler system to create a model of the process. Data is collected to analyze process tool behavior, but the collected data is typically a small amount of data and the data is collected at a high level. The data, therefore, does not provide sufficient granularity to enable a user to gain a more accurate analysis of process tool behavior. In addition, the data is collected at some point in time, and the model, therefore, is valid for that point in time. However, process tool behavior changes (e.g., equipment drift) and processes change (e.g., recipe changes), and the models are not capable of reflecting these changes since the model is based on data collected at an earlier point in time.

BRIEF DESCRIPTION OF THE DRAWINGS

The present invention is illustrated by way of example, and not by way of limitation, in the figures of the accompanying drawings and in which.

DETAILED DESCRIPTION

Embodiments of the invention are directed to a method and system for determining an optimal scheduling policy using state data that reflects a current state of a factory. A scheduler system obtains a basic model of a manufacturing process for the production of one or more products. The basic model is based on a first set of data collected at a point in time from a plurality of tools used to manufacture the one or more products. The system incorporates a second set of data, which is collected from the plurality of tools after the first set of data, into the basic model to generate a comprehensive model of the manufacturing process. The second set of data reflects a current state of a factory. The system evaluates a plurality of scheduling policies using the comprehensive model and selects an optimal scheduling policy from the plurality of scheduling policies based on the comprehensive process model evaluation to achieve a manufacturing objective. Embodiments of the present invention generate a comprehensive process model using state data that reflects a current state of a factory and to determine an optimal schedule based on the comprehensive process model.

Figure 1:
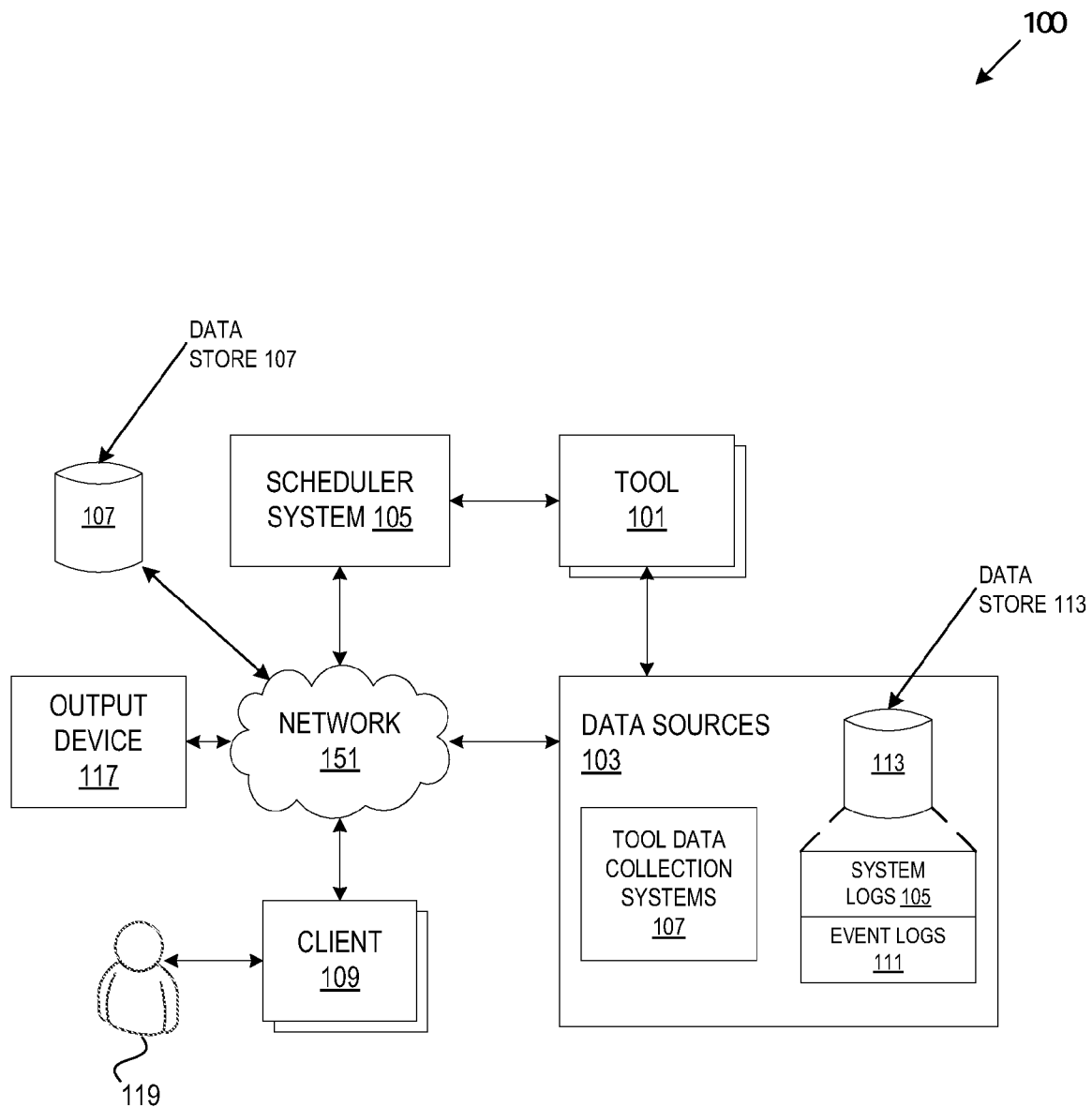
FIG. 1 illustrates an exemplary networking environment of a scheduler system for determining an optimal scheduling policy using state data that reflects a current state of a factory.

FIG. 1 illustrates an exemplary network architecture 100 on which embodiments of the present invention can be implemented. The network architecture 100 can include processing tools 101, data sources 103, and a scheduler system 105. In one embodiment, a scheduler system 105 can reside in a factory and be coupled locally to one or more process tools 101 and one or more data sources 103. A factory can be a factory to manufacture products, such as semiconductors. The scheduler system 105, process tools 101, and data sources 103 can be maintained by a factory administrator. The scheduler system 105 can be hosted by any type of computing device including server computers, desktop computers, laptop computers, handheld computers or similar computing device. The scheduler system 105 can connect to the process tools 101 directly or indirectly via a hardware interface (not shown). The scheduler system 105 can connect to the data sources 103 and one or more client machines 109 via a network 151. The client machines 109 can be hosted by any type of computing device including desktop computers, laptop computers, mobile communications devices, cell phones, smart phones, handheld computers, or similar computing device. The network 151 can be a local area network (LAN), such as an intranet within a company, a wireless network, a mobile communications network, a wide area network (WAN), such as the Internet or similar communication system. The network 151 can include any number of networking and computing devices such as wired and wireless devices.

Examples of the processing tools 101 include tools (e.g., etchers, chemical vapor deposition furnaces, etc.) for the manufacture of electronic devices, such as semiconductors, or of a type for manufacturing other products. A wafer manufacturing site (factory) may include processing tools 101 that are clustered tools. For example, a processing tool 101 may have tool components, such as one main transfer chamber and a few process chambers (e.g., plasma etching on multi-chamber cluster tools).

A user, such as an industrial engineer and factory administrator, can define a manufacturing objective. For example, an objective may be that the manufacturing cycle time and utilization for manufacturing product A must meet certain thresholds. The scheduler system 105 can receive data that defines the manufacturing objective and determine an optimal scheduling policy (optimal schedule) to meet the manufacturing objective. Traditional modeling and scheduling systems use a process model that is based on factory data from some time in the past to evaluate a number of different scheduling polices (schedules). The factory data for these traditional solutions, however, becomes stale as tools and processes change over time. Unlike conventional modeling and scheduling systems, the scheduler system 105 can periodically collect state data that reflects a current state of a factory and use the current factory state data to generate a comprehensive process model. The comprehensive process model, therefore, can provide a more accurate representation of the processes. The scheduler system 105 can use the comprehensive process model to evaluate a number of schedules that are stored in a data store 107 and determine which schedule is an optimal schedule to achieve the current manufacturing objective.

The scheduler system 105 can periodically collect factory state data, such as process data, tool data, lot data, event data, etc., from process tools 101 and data sources 103. The scheduler system 105 can store the state data in the data store 107. A data store 107,113 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items Data sources 103 can include event logs 111, dispatching system logs 105, and tool data collection systems 107. Data sources 103 can collect process data, tool data, and lot data. Processing tools 101 are constantly generating events which can be recorded in an event log. Each processing tool 101 can generate an event log 111 that records an extensive amount of event data indicating the occurrence of an activity and/or type or activity of a process tool and/or tool component. Each event corresponds to an action occurring on a processing tool 101. In one embodiment, the scheduler system 105 is coupled to a factory system data source (e.g., MES, ERP) (not shown) to receive lot data and tool status data. Dispatching system logs 105 and event logs 111 can be stored in one or more data stores 113. A tool data collection system 107 can be hosted by any type of computing device including desktop computers, laptop computers, handheld computers or similar computing device.

The scheduler system 105 can output scheduling data (e.g., an optimal scheduling policy, an alarm) to one or more client machines 109 accessible by one or more users 119 (e.g., industrial engineer, factory administrator). For example, the scheduler system 105 can generate graphical user interfaces (GUIs) to display the optimal scheduling policy (e.g., a production plan) accessible by client machine 109. The scheduler system 105 can also send an email message and/or text message regarding the scheduling data (e.g., an alarm) to client machines 109 accessible by users 119. The scheduler system 105 can also output scheduling data (e.g., an optimal scheduling policy, an alarm) to an output device 117 (e.g., display unit, printer) coupled to the scheduler system 105. The scheduler system 105 can be locally coupled to the output device 117 or can communicate to the output device 117 via network 151.

Figure 2:
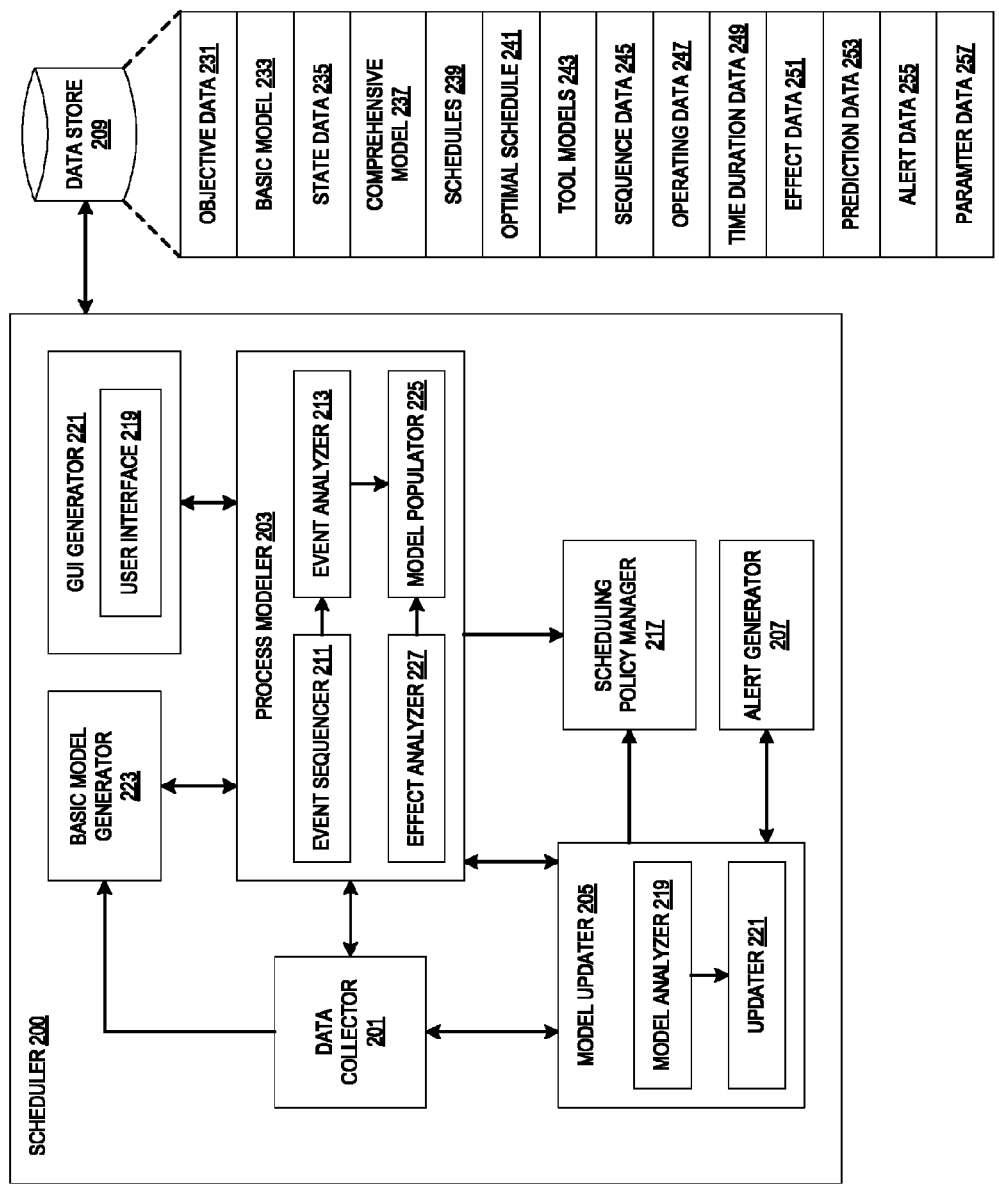
FIG. 2 is a block diagram illustrating a scheduler system.

FIG. 2 is a block diagram illustrating a scheduler 200 for determining an optimal scheduling policy using state data that reflects a current state of a factory. In one embodiment, the scheduler 200 is hosted by a computing device as described in conjunction with FIG. 1. The scheduler 200 can receive a manufacturing objective, continually collect factory state data from a variety of data sources, use the recently collected state data to populate a basic model of the factory process to create a comprehensive model of the process, and determine an optimal scheduling policy based on the comprehensive model to achieve a current manufacturing objective. The scheduler 200 can include a data collector 201, a basic model generator 223, a process modeler 203, a model updater 205, a scheduling policy manager 217, an alert generator 207, and a graphical user interface (GUI) generator 221.

Scheduling decisions can include decisions of which products to process, in what order to process the products, and how many of each product to process. The scheduler 200 can receive objective data 231 from a user that indicates a manufacturing objective for producing one or more products (e.g., semiconductors). For example, an industrial engineer can define an objective that the manufacturing cycle time to produce product A meet a time threshold and that manufacturing utilization to produce product A meet a utilization threshold. The GUI generator 221 can generate a user interface 219 to receive the user input. The user interface can be a graphical user interface. The objective data 231 can be stored in a data store 209 that is coupled to the scheduler 200.

A key aspect in solving scheduling problems is the creation of high-fidelity models of the process for predicting the impact of scheduling decisions. The basic model generator 223 can generate a basic model 233 of a manufacturing process. The basic model generator 223 can use state data, such as a first set of collected data, to create the basic model 233. In one embodiment, a basic model 233 was previously created using state data that was collected at an earlier point in time and stored in a data store 209 and the basic model generator 223 can obtain the basic model 233 from the data store 209. Unlike conventional scheduling and modeling systems, the data collector 201 can periodically collect state data 235 that reflects the current state of a factory from the variety of data sources (e.g., data sources 103 in FIG. 1) and the process modeler 203 can use recently collected state data 235 to generate a comprehensive process model 237. The data collector 201 continually obtains state data 235 in order to have the most recent data reflecting a current state of the factory. For example, the data collector 201 can obtain new state data 235 periodically (e.g., every five minutes). Parameter data 257 that is stored in the data store 209 can include parameters identifying a time period for collecting the state data 235. The parameter data 257 can be user-defined data. The state data 235 can be stored in the data store 209. The data collector 201 can collect factory state data 235, such as process data, tool data, lot data, directly from process tools, and can obtain data from a variety of data sources, such as system logs, tool event logs, and tool data collection systems.

The data collector 201 can collect all event data (e.g., events) published by process tool via the tool event logs. The data collector 201 can capture each of the events with the specific position (e.g., buffer chamber) at which the event occurred. Processing tools constantly generate events which can be recorded in an event log. Each processing tool can generate an event log that records an extensive amount of event data that indicates an occurrence of an activity and/or type or activity. Each event corresponds to an action occurring on a processing tool and/or tool component. Examples of events include a system is idle for the cleaning, a process tool door is open, a robot is moving, a wafer is transferred, a recipe has started, a recipe has completed, etc. The state data 235 can include data collected from the process tool event logs. The process modeler 203 uses the objective data 231 and the recently collected state data 235 to populate the basic model 231 to create a comprehensive model 237 of the process.

The process modeler 203 can analyze the recently collected state data 235 to identify the changes in the operating states of each process tool and generate a process model for each process tool and save it as tool models 243 in the data store 209. Tool models 243 are models for each instance of a process step. For example, a factory may have a set of ten CMP tools (chemical-mechanical planarization tools) and/or ten CVD tools (chemical vapor deposition tools). Traditionally, a modeling system can collect state data at a single, earlier point in time, and analyze the state data to determine a general processing rate for the CMP tools and/or CVD tools, such as 35 wafers per hour. Unlike the conventional modeling systems, the process modeler 203 can continue to collect factory state data 235 and use the recently collected state data 235 to determine a more accurate throughput of each individual process by creating a tool model 243 for each instance of a process tool. The process modeler 203 can include an event sequencer 211 to analyze the state data 235 to define one or more sequences of events. The sequences of events can be stored as sequence data 245 in the data store 209. The event sequencer 211 can generalize the events by defining and using naming criteria such that similar events which happen on different chambers or positions (or tools) have similar names. The event sequencer 211 can identify operating states in the process tools and changes in the states in the process tools from the sequences data 245. The operating states can be stored as operating data 247 in the data store 209.

The process modeler 203 can include an event analyzer 213 to analyze the sequence data 245 and operating data 247 to determine a time that is spent in the different operating states and save the times as time duration data 249. For example, the event analyzer 213 can perform a simple analysis of the event sequences to determine the time from when a wafer (or glass) enters a chamber until the time the wafer (or glass) begins processing. In another example, the event analyzer 213 can perform a more complex analysis of the event sequences to determine the time associated with when a wafer associated with product A has stopped processing until when a wafer for product B has started processing. In one embodiment, the event analyzer 213 analyzes the sequences of events based on parameters that can be defined by a user and stored as parameter data 257 in the data store 209. For example, a user can define that the analysis of the sequences of data be based on the average time it takes to switch from manufacturing product A to product B. The process modeler 203 can include an effect analyzer 227 to analyze the state data 235 to generate effect data 251. For example, the effect analyzer 227 can determine the costs to switch from manufacturing product A to manufacturing product B and store it as effect data 251. The effect analyzer 227 can also determine non-linear effects, such as how switching from manufacturing product A to product B might be different from switching from product B to product A and stored it as effect data 251. The event analyzer 213 and effect analyzer 227 can analyze the sequences of events and state data based on parameter data 257 that is stored in the data store 209. The parameter data 257 can be user-defined data. For example, a user can define that the analysis of the sequences of data be based on the average time it takes to switch from manufacturing product A to product B.

The process modeler 203 can use the tool models 243 to generate the comprehensive model 237, and thus, determine more accurate schedules or more effective schedules based on the tool models 243 for individual process tools. The process modeler 203 can add the time duration data 249, the effect data 251, and the most recently collected state data 235 to the basic process model 233 to create the comprehensive process model 237. The process modeler 203 can use the recently collected state data 235 to determine a more accurate throughput of each individual process by creating a tool model 243 for each instance of a process tool. The process modeler 203 can use the throughput as determined by the tool models 243 to calculate a time that is spent in the different operating states and save the times as time duration data 249. The process modeler 203 can add the duration data 249 to the basic process model 233 to create the comprehensive model 237. The process modeler 203 can also use the recently collected state data 235 to generate effect data 251 (e.g., the costs to switch from manufacturing product A to manufacturing product B) and add the effect data 251 to the basic process model 233 to create the comprehensive model 237.

The model 237 is a comprehensive model in that it can predict the impact of individual scheduling decisions. For example, a comprehensive model 237 for manufacturing product A and product B takes into account the time it takes to switch from product A to product B and the time it takes to switch from product B to product A based on the time duration data 249. The comprehensive model 237 can also take into account any respective costs based on the effect data 251.

The model populator 225 can execute the comprehensive process model 237 according to various schedules 239 that are stored in the data store 209 and generate a predicted performance of a process according to the various schedules 239 based on the recently collected state data 235. The scheduling policy manager 217 can analyze the prediction data 253 generated from executing the comprehensive model 237 to determine an optimal scheduling policy 241 by identifying which of the schedules 239 best meets a current manufacturing objective as defined by the objective data 231. The predictions can be stored as prediction data 253 in a data store 209. The various schedules 239 can be schedules that were previously generated by scheduler 200 and/or created by a user, such as an industrial engineer, factory administrator, etc.

The scheduling policy manager 217 can store the optimal scheduling policy 241 in the data store 209. The optimal scheduling policy 241 can be in a form of a production plan. The scheduling policy manager 217 can provide the optimal scheduling policy 241 (e.g., a production plan) to a user (e.g., an industrial engineer). For example, the scheduling policy manager 217 can display a production plan to a user, print a production plan via a printer, and/or send the production plan to a client computer (e.g., send an email of the production plan). In one embodiment, the scheduler 200 can provide the optimal scheduling policy 241 to a dispatcher. The dispatcher can be integrated through the MES to dispatch, for example, wafer lots accordingly.

The model updater 205 can update the comprehensive model 237 as process tool performance and processes change over time. As process tools run in production, recipes (process parameters) can change and new processing policies can be implemented. In addition, the behavior of the process tools can vary over time and lead to differences in a tool's performance. Common examples of process tool behavioral variances include a drift in pump down time or a drift in robot transfer time. The model updater 205 can determine whether any new factory state data 235 has been collected by the data collector 201 and can use the new state data 235 to update a tool model 243 that is associated with each tool and tool position/chamber to determine a current state of a tool and/or tool position/chamber (e.g., to determine a current throughput of a tool executing a step in a process). The model updater's continual update of a tool model 243 helps to account for recipe changes that are introduced, new policies that are implemented, and process tool behavior variances that occur. The model updater 205 can update the tool model 243 using the new state data 235 to generate updated time duration data for the tools and updated effect data. The model updater 205 can replace any existing time duration data and effect data in the comprehensive model with the updated time duration data and updated effect data to update the comprehensive process model.

The model updater 205 can use the updated tool models 243 and the most recently collected state data 235 to determine whether to update the comprehensive process model 237. The model updater 205 can include a model analyzer 219 to determine whether to update the comprehensive model 237. The model analyzer 219 can use the model populator 225 to populate the comprehensive to generate a current prediction of the performance of the process and store it as part of the prediction data 253. The model analyzer 219 can compare the current prediction data 253 to past prediction data 253 (e.g., generated by model populator 225 and stored in data store 209) and determine whether there is a relevant difference in the prediction data 253. Parameter data 257 that is stored in the data store 209 can include threshold data to identify whether a difference is a relevant difference, such that the comprehensive model 237 is to be updated. The threshold data can be user-defined data. The model updater 205 includes an updater 211 to update a comprehensive model if there is a relevant difference in prediction data. The updated comprehensive process model 237 can be stored in data store 209.

The alert generator 207 can send an alert (alarm) to a client or an output device to notify a user, such as an industrial engineer and a factory administrator, when the manufacturing process and/or a process tool deviate from the observed past behavior. Alert data 255 can be stored in the data store 209. The data store 209 can also store thresholds, models, calculations, and policies created by any of the process modeler 203, the model updater 205, and the scheduling policy manager 217.

The scheduling policy manager 217 can use the updated comprehensive model 237 to perform another evaluation of the various schedules 239 that are stored in the data store 209 and determine a new optimal schedule 241. The scheduling policy manager 217 can update the optimal schedule 241 and can provide the updated optimal schedule 241 to an output device (e.g., a display, a printer) and/or to a client.

Figure 3:
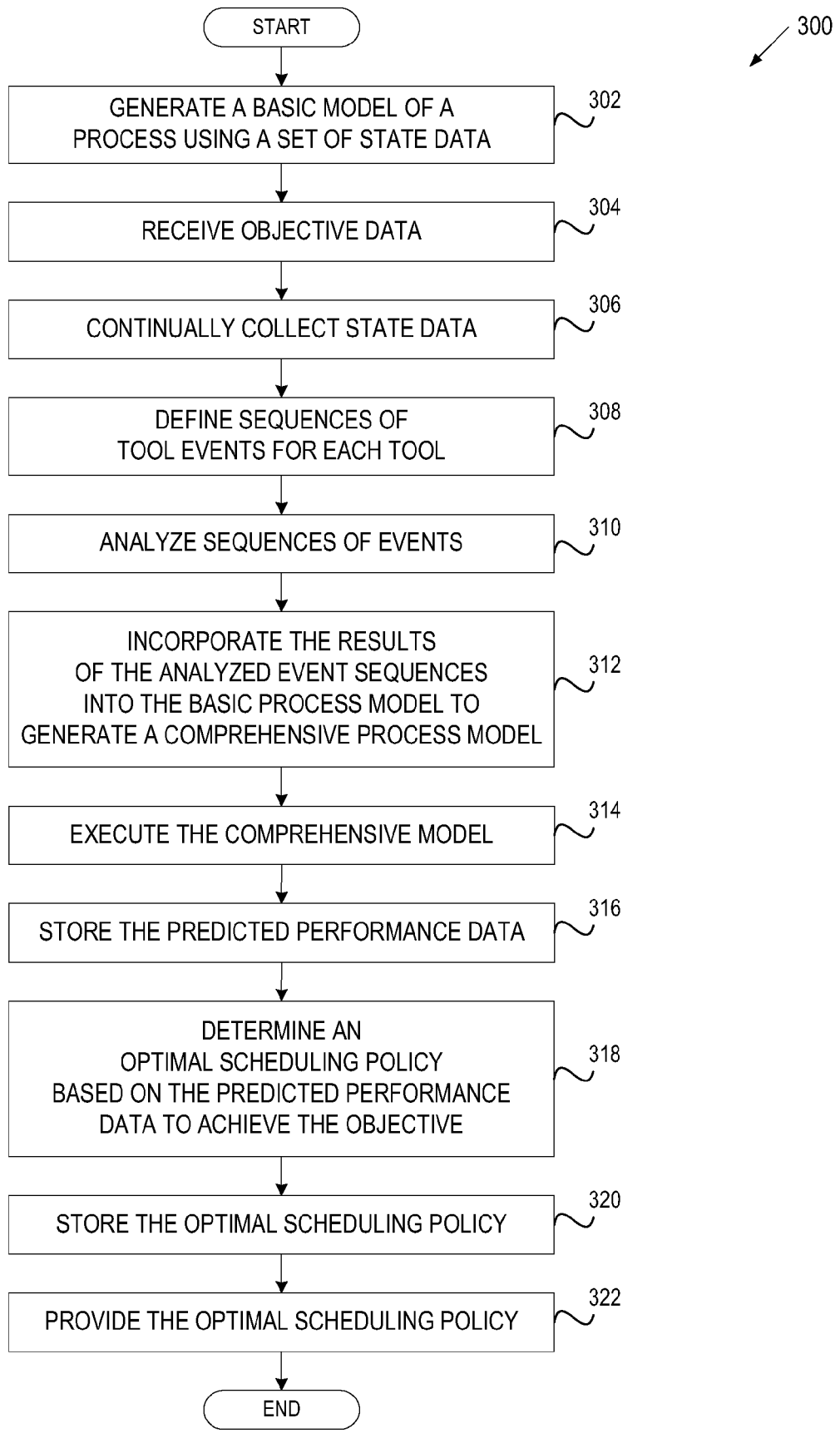
FIG. 3 is a flowchart which illustrates an embodiment of a method for determining an optimal scheduling policy using state data that reflects a current state of a factory.

FIG. 3 is a flowchart which illustrates an embodiment of a method 300 for determining an optimal scheduling policy using state data that reflects a current state of a factory. Method 300 can be performed by processing logic that can comprise hardware (e.g., circuitry, dedicated logic, programmable logic, microcode, etc.), software (e.g., instructions run on a processing device), or a combination thereof. In one embodiment, method 300 is performed the scheduler system 150 of FIG. 1.

At block 302, the scheduler system uses a set of state data to generate a basic model of a process. A basic process model may be configurable by a user via a user interface. The user can receive data (e.g., user input) that defines which data and factory operation components (e.g., equipment, WIP (work in progress), products, product routes and operation steps) are needed to execute a process, such as a process to manufacture Product A. The system generates a basic model of a process by analyzing the behavior of each tool using a set of state data that has been collected at that particular point in time. The set of state data includes data representing the state of a factory (e.g., representing the behavior of one or more tools and the processes performed by the tools) collected over a period of time. For example, a user can define a process and factory operation component to manufacture product A and product B and the system uses the set state data that has been collected at a particular point in time to analyze the performance of the tools used to produce product A and product B to generate an averaged statistical result which becomes the basic process model. Subsequently, the basic process model can be used to generally predict how a process (e.g., to manufacture product A and product B) may perform and is valid for that particular point in time for when the state data was collected. Thus, the state data used to generate the basic model easily becomes stale and outdated data. In one embodiment, a basic process model was previously created and stored in a data store that is coupled to the system and the system obtains the basic model from the data store.

At block 304, the system receives objective data that indicates a current manufacturing objective for producing one or more products (e.g., semiconductors). For example, an industrial engineer can define an objective that the manufacturing cycle time for producing product A and product B meets a time threshold and that manufacturing utilization for producing product A and product B meets a utilization threshold. In one embodiment, the system generates and displays a graphical user interface to receive the objective data as user input from a user.

Unlike conventional modeling systems and scheduling systems that schedule processes based on the stale, outdated state data, the scheduler system continually collects state data that reflects a current state of a factory at block 306. The state data can be collected directly from each tool and a variety of data sources (e.g., event logs, dispatching system logs, tool data collection systems). The state data can include data associated with the performance of a process tool, the performance of a tool component, the operating conditions, process data, lot data, etc. The scheduler system can collect data periodically based on parameters (e.g., every five minutes).

Processing tools constantly generate events (event data) that indicate an occurrence of an activity and/or type of activity. Each event corresponds to an action occurring on a processing tool and/or tool component. For example, the scheduler system can collect event data indicating a system is idle for the cleaning, a process tool door is open, a robot is moving, a wafer is transferred, a recipe is started, a recipe is completed, etc. At block 308, the scheduler system defines one or more sequences of events for each tool using the collected state data. The system can generalize the events by defining and using naming criteria such that similar events which happen on different chambers or positions (or tools) have similar names. The system identifies various operating states in the process tools and changes in the operating states in the process tools by defining the sequences of events.

At block 310, the scheduler system analyzes the sequences of events for each tool, for example, to determine a duration for each operating state, to determine which recipes were run, to calculate the duration of how long the different states take to perform, to calculate the duration of how long it takes to transfer a wafer from load to a chamber, to calculate the duration of how long it takes to execute a clean that runs after each wafer is processed, to calculate the duration of how long it takes to execute a pre-clean that runs before a lot is executed, etc. The system can also analyze the sequence of events to calculate costs for switching from manufacturing product A to manufacturing product B, to calculate the costs for switching from manufacturing product B to manufacturing product A, and to determine any non-linear effects of how switching from product A to product B might be different from switching from product B to product A. In one embodiment, at block 310, the system analyzes the sequences of events based on parameters that can be defined by a user. For example, a user can define that the analysis of the sequences of data be based on the average time it takes to switch from manufacturing product A to product B. In one embodiment, processing logic receives the parameters for an analysis as user input via a GUI. The parameters can be stored in the data store and processing logic can obtain the parameters at block 310. Processing logic can store the results of the analysis of the sequences of events in the data store.

At block 312, the scheduler system adds the results from the event sequence analysis (from block 310) (e.g., the switching costs and durations calculated from the analysis) into the basic model of the process that was generated or obtained (from block 302) to generate a comprehensive model of the process. Unlike the basic model generated or obtained at block 302, which is based on a set of stale, outdated state data that was collected at an earlier point in time (a first point in time), the state data collected from at least a second point in time (from block 306) is used to generate time duration data and effect data. The scheduler system can add the time duration data and effect data to the basic process model to create a comprehensive process model. In one embodiment, a basic process model can be changed to create a comprehensive process model by a user via a user interface. The second point of time can occur after one or more changes in the state of a factory has occurred and/or has been detected since the first set of state data (data collected a first point in time) was collected.

At block 314, the scheduler system executes the comprehensive model to predict the performance of a process (e.g., to manufacture product A and product B) and to evaluate various scheduling policies that are stored in the data store. The execution of the comprehensive process model takes into account the analysis results from block 310 (e.g., the costs to switch from manufacturing product A to product B and to switch from manufacturing product B to product A, and the duration in each operating state of the process). At block 316, the scheduler system stores the predicted process performance data based on the comprehensive model in the data store.

At block 318, the scheduler system analyzes the predicted performance data using the objective data (e.g., to manufacture product A and product B while meeting a cycle time threshold and manufacturing utilization threshold) and selects which of the various scheduling policies is an optimal scheduling policy. The system stores the optimal scheduling policy at block 320 in the data store.

For example, an industrial engineer may have a set of ten lots that are for producing product A as a set of ten lots that are for producing product B. The lots may sequentially be processed as a first lot to manufacture product A, a second lot to manufacture product B, a third lot to manufacture product A, a fourth lot to manufacture product B, etc. It might be more beneficial, however, to first batch together a number of lots to manufacture product A, and wait to manufacture product B. For example, depending upon how long it takes to switch the manufacturing process between processing lots to manufacture product A to processing lots to manufacture product B, there may be a cost benefit to first processing five lots to manufacture product A, and subsequently processing three lots to manufacture product B. For example, the time to switch from product A to product B may be five minutes and the time to switch from product B to A is ten minutes. The scheduler system uses the comprehensive model to determine an optimal scheduling policy to achieve the objective. In the example where the objective is to manufacture product A and product B while meeting a cycle time threshold and manufacturing utilization threshold, the optimal scheduling policy may include to hold the second lot for product B and run the third lot instead, which is a lot for product A in order to avoid the switching costs from switching from manufacturing the first lot for product A to manufacturing product B.

At block 322, the scheduler system provides the optimal scheduling policy to a user. The optimal scheduling policy can be provided to a user as a production plan. In one embodiment, scheduler system displays the optimal scheduling policy via a GUI. The optimal scheduling policy can also be printed via a printer or delivered to a user via a client device.

Figure 4:
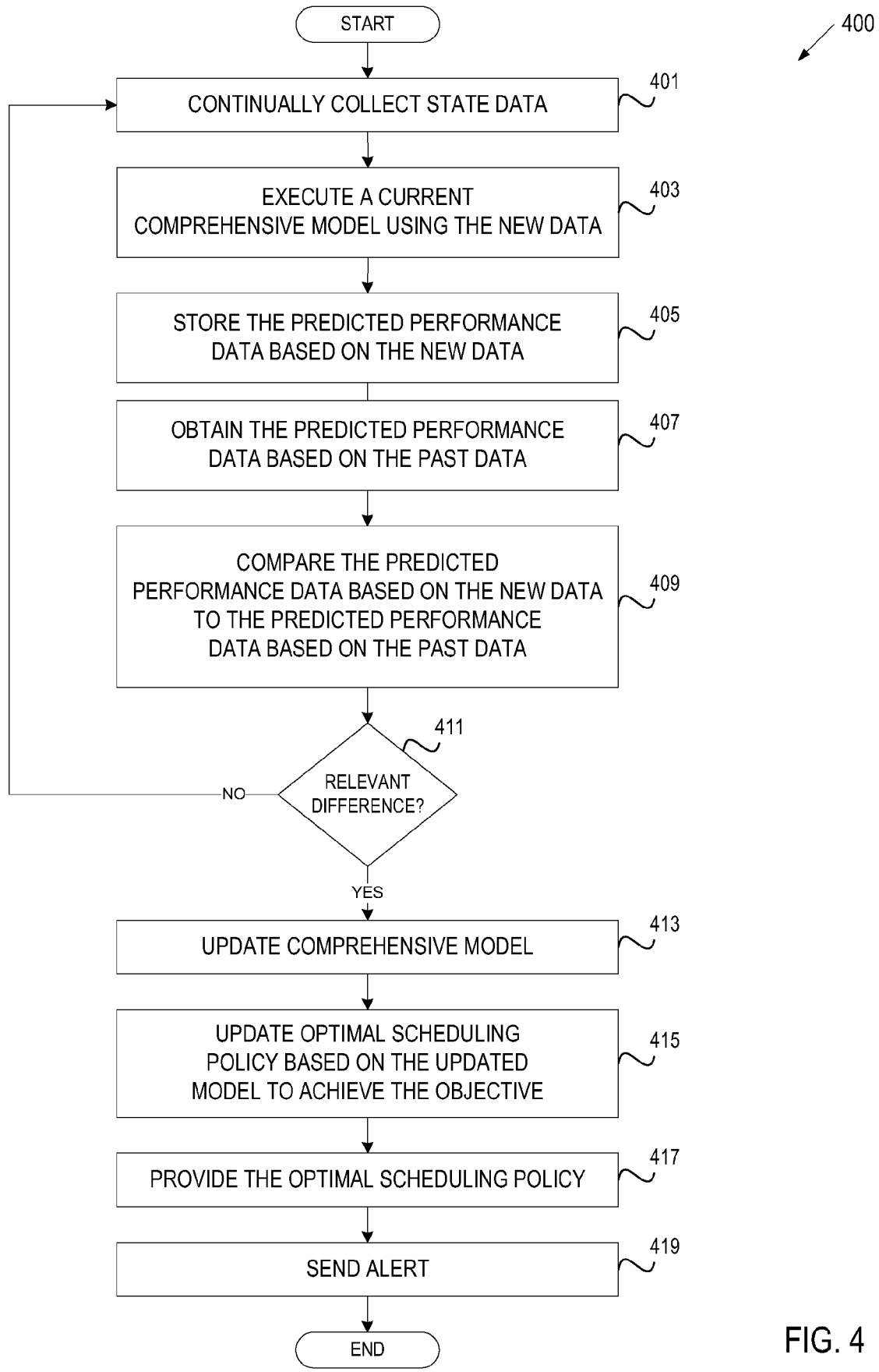
FIG. 4 is a flowchart which illustrates an embodiment of a method for updating an optimal scheduling policy using state data that reflects a current state of a factory.

In one embodiment, scheduler system can provide the optimal scheduling policy to a dispatching system. In one embodiment, the method 300 updates optimal scheduling policy periodically. One embodiment of periodically updating the optimal scheduling policy is discussed in greater detail below in conjunction with FIG. 4, FIG. 4 is a flowchart which illustrates an embodiment of a method 400 for updating an optimal scheduling policy using state data that reflects a current state of a factory. Method 400 can be performed by processing logic that can comprise hardware (e.g., circuitry, dedicated logic, programmable logic, microcode, etc.), software (e.g., instructions run on a processing device), or a combination thereof. In one embodiment, method 400 is performed the scheduler system 150 of FIG. 1.

In one embodiment, a scheduler system has already obtained a basic model of a process, has received objective data indicating a current manufacturing objective, and has periodically collected and analyzed factory state data to generate a comprehensive model of the process incorporating the results of an analysis of sequences of events (e.g., switching costs, duration spent in each operating state in the process).

At block 401, the scheduler system continually collects state data that reflects a current state of the factory. For example, the scheduler system can collect factory state data periodically (e.g., every five minutes). Collecting the current factory state data can help ensure the method 400 uses the most recent state data reflecting a more accurate representation of the tools' behavior and the processes performed by the tools. The time duration to collect the state data can be user defined via a GUI and stored as parameter data in a data store that is coupled to the scheduler system.

At block 403, the scheduler system executes a current comprehensive process model (e.g., a comprehensive model generated at block 312 in FIG. 3) using the recently collected state data (at block 401) to predict the performance of the process based on the new state data. At block 405, processing logic stores the predicted performance data based on the new state data in the data store.

At block 407, the scheduler system obtains the predicted performance data based on past state data (from block 316 in FIG. 3) that is stored in the data store. At block 409, the scheduler system compares the predicted performance data based on the new state data to the predicted performance data based on the past state data and determines whether there is a relevant difference in performance data at block 411. There can be a difference in performance data due to a different in tool behavior, changes in recipes, etc. A threshold can be used to determine whether the difference in performance data is a relevant difference (as opposed to a slight, irrelevant difference). The threshold can be a user-defined threshold obtained via a GUI and stored as parameter data in the data store. If there is not a relevant difference in performance data (at block 411), the scheduler system can return to block 401 to continually collect factory state data. If there is a relevant difference in performance data (block 411), the scheduler system can update the comprehensive model using the recently collected state data at block 413. The scheduler system can execute the tool model using the recently collected state data and generate updated time duration data for the tools and updated effect data. The updated time duration data and updated effect data can be used to update any existing time duration data and effect data in the comprehensive model to update the comprehensive process model. The updated comprehensive process model can be stored in the data store.

At block 415, the scheduler system updates the optimal scheduling policy based on the updated comprehensive model and stores the updated scheduling policy in the data store. At block 417, the scheduler system provides the updated optimal scheduling policy to a user. In one embodiment, at block 419, the scheduler system sends an alert to a user, a client, and/or a manufacturing system indicating there is a relevant difference in performance data between the predicted performance based on the new data and the predicted performance based on the past data. The scheduler system can display an alert on a display coupled to the scheduler system, display an alert on a client computer, send an alert to a user as an email message to a client device, a text message to a client device, or as an alarm to an output device.

Figure 5:
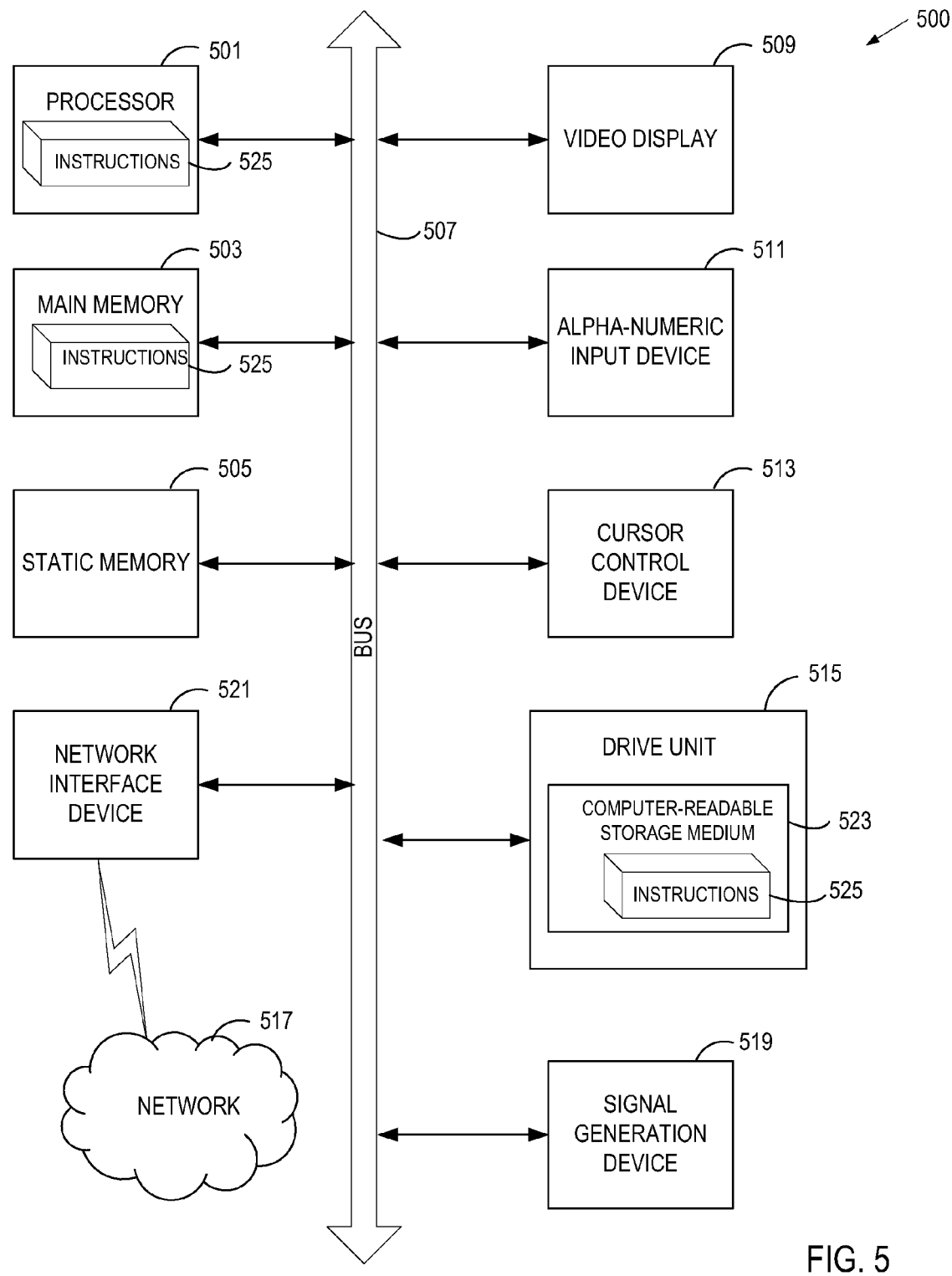
FIG. 5 illustrates an exemplary computer system.

FIG. 5 is a diagram of one embodiment of a computer system for determining an optimal schedule using data that reflects a current state of a factory. Within the computer system 500 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 501, a main memory 503 (e.g., read-only memory (ROM), flash memory, dynamic random access memory (DRAM) such as synchronous DRAM (SDRAM) or DRAM (RDRAM), etc.), a static memory 505 (e.g., flash memory, static random access memory (SRAM), etc.), and a secondary memory 515 (e.g., a data storage device in the form of a drive unit, which may include fixed or removable computer-readable storage medium), which communicate with each other via a bus 507.

Processing device 501 represents one or more general-purpose processing devices such as a microprocessor, central processing unit, or the like. More particularly, the processing device 501 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 501 may also be one or more special-purpose processing devices such as an application specific integrated circuit (ASIC), a field programmable gate array (FPGA), a digital signal processor (DSP), network processor, or the like. Processing device 501 is configured to execute the instructions 525 for performing the operations and steps discussed herein.

The computer system 500 may further include a network interface device 521. The computer system 500 also may include a video display unit 509 (e.g., a liquid crystal display (LCD) or a cathode ray tube (CRT)) connected to the computer system through a graphics port and graphics chipset, an alphanumeric input device 511 (e.g., a keyboard), a cursor control device 513 (e.g., a mouse), and a signal generation device 519 (e.g., a speaker).

The secondary memory 515 may include a machine-readable storage medium (or more specifically a computer-readable storage medium) 523 on which is stored one or more sets of instructions 525 embodying any one or more of the methodologies or functions described herein. The instructions 525 may also reside, completely or at least partially, within the main memory 503 and/or within the processing device 501 during execution thereof by the computer system 500, the main memory 503 and the processing device 501 also constituting machine-readable storage media. The instructions 525 may further be transmitted or received over a network 517 via the network interface device 521.

The computer-readable storage medium 523 may also be used to store the instructions 525 persistently. While the computer-readable storage medium 523 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 525, components and other features described herein (for example in relation to FIG. 1) can be implemented as discrete hardware components or integrated in the functionality of hardware components such as ASICS, FPGAs, DSPs or similar devices. In addition, instructions 525 can be implemented as firmware or functional circuitry within hardware devices. Further, the instructions 525 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "obtaining," "incorporating," "evaluating," "selecting," "creating," "detecting," "updating," "performing," "collecting," "storing," "determining," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for determining an optimal scheduling policy using data that reflects a current state of a factory. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
obtaining, by a scheduling server, a basic model of a manufacturing process for the production of a first product and a second product, wherein the basic model is based on a first set of data collected at a point in time from a plurality of tools used to manufacture the first product and second product;
incorporating a second set of data, which is collected from the plurality of tools after the first set of data, into the basic model to generate a comprehensive model of the manufacturing process, the second set of data reflecting a current state of a factory including effect data for switching production from the first product to the second product of the manufacturing process;
executing the comprehensive model to predict performance of the manufacturing process and to evaluate a plurality of scheduling policies using the comprehensive model; and
selecting an optimal scheduling policy from the plurality of scheduling policies based on the comprehensive process model evaluation to achieve a manufacturing objective.

2. The method of claim 1, wherein the first product and the second product are semiconductors.

3. The method of claim 1, further comprising:
creating models for the plurality of tools using the second set of data reflecting the current state of the factory.

4. The method of claim 1, further comprising:
detecting at least a third set of data that is collected from the plurality of tools after the second set of data;
updating the comprehensive model using the at least third set of data;
performing a second evaluation of the plurality of scheduling policies using the updated comprehensive model; and
selecting an optimal scheduling policy from the plurality of scheduling policies based on the second comprehensive process model evaluation.

5. The method of claim 1, further comprising:
periodically collecting data from the plurality of tools; and
storing the periodically collected data.

6. The method of claim 1, further comprising:
storing objective data indicating the manufacturing objective for producing the first product and the second product.

7. The method of claim 1, wherein evaluating the plurality of scheduling policies comprises:
determining current times for process tools to execute process steps for the plurality of scheduling policies; and
selecting one of the plurality of scheduling policies as the optimal scheduling policy based on the current times and the manufacturing objective.

8. A system comprising:
a persistent storage unit to store a plurality of scheduling policies, a first set of data collected at a point in time from a plurality of tools used to manufacture a first product and a second product, a second set of data that is collected from the plurality of tools after the first set of data and reflecting a current state of a factory including effect data for switching production from the first product to the second product of the manufacturing process, and a basic model of a manufacturing process for the production of the first product and the second product, wherein the basic model is based on the first set of data; and
a processor coupled to the persistent storage unit to incorporate the second set of data into the basic model to generate a comprehensive model of the manufacturing process, to execute the comprehensive model to predict performance of the manufacturing process and to evaluate the plurality of scheduling policies using the comprehensive model, and to select an optimal scheduling policy from the plurality of scheduling policies based on the comprehensive process model evaluation to achieve a manufacturing objective.

9. The system of claim 8, wherein the first product and the second product are semiconductors.

10. The system of claim 8, further comprising the processor:

to create models for the plurality of tools using the second set of data reflecting the current state of the factory.

11. The system of claim 8, further comprising the processor:
to detect at least a third set of data collected from the plurality of tools after the second set of data;
to update the comprehensive model using the at least third set of data;
to perform a second evaluation of the plurality of scheduling policies using the updated comprehensive model; and
to select an optimal scheduling policy from the plurality of scheduling policies based on the second comprehensive process model evaluation.

12. The system of claim 8, further comprising:
the processor to periodically collect data from the plurality of tools; and
the persistent storage unit to store the periodically collected data.

13. The system of claim 8, further comprising:
the processor to receive objective data indicating the manufacturing objective for producing the first product and the second product; and
the persistent storage unit to store the objective data.

14. The system of claim 8, wherein to evaluate the plurality of scheduling policies comprises the processor:
to determine current times for process tools to execute process steps for the plurality of scheduling policies; and
to select one of the plurality of scheduling policies as the optimal scheduling policy based on the current times and the manufacturing objective.

15. A computer-readable storage medium including instructions that, when executed by a computer system, cause the computer system to perform a set of operations comprising:
obtaining a basic model of a manufacturing process for the production of a first product and a second product, wherein the basic model is based on a first set of data collected at a point in time from a plurality of tools used to manufacture the first product and the second product;
incorporating a second set of data, which is collected from the plurality of tools after the first set of data, into the basic model to generate a comprehensive model of the manufacturing process, the second set of data reflecting a current state of a factory including effect data for switching production from the first product to the second product of the manufacturing process;
executing the comprehensive model to predict performance of the manufacturing process and to evaluate a plurality of scheduling policies using the comprehensive model; and
selecting an optimal scheduling policy from the plurality of scheduling policies based on the comprehensive process model evaluation to achieve a manufacturing objective.

16. The computer-readable storage medium of claim 15, wherein first product and the second product are semiconductors.

17. The computer-readable storage medium of claim 15, further comprising:
detecting at least a third set of data that is collected from the plurality of tools after the second set of data;
updating the comprehensive model using the at least third set of data;
performing a second evaluation of the plurality of scheduling policies using the updated comprehensive model; and
selecting an optimal scheduling policy from the plurality of scheduling policies based on the second comprehensive process model evaluation.

18. The computer-readable storage medium of claim 15, further comprising:
periodically collecting data from the plurality of tools; and
storing the periodically collected data.

19. The computer-readable storage medium of claim 15, further comprising:
storing objective data indicating the manufacturing objective for producing the first product and the second product.

20. The computer-readable storage medium of claim 15, wherein evaluating the plurality of scheduling policies comprises:
determining current times for process tools to execute process steps for the plurality of scheduling policies; and
selecting one of the plurality of scheduling policies as the optimal scheduling policy based on the current times and the manufacturing objective.

* * * * *